United States Patent Office 2,735,303
Patented Feb. 21, 1956

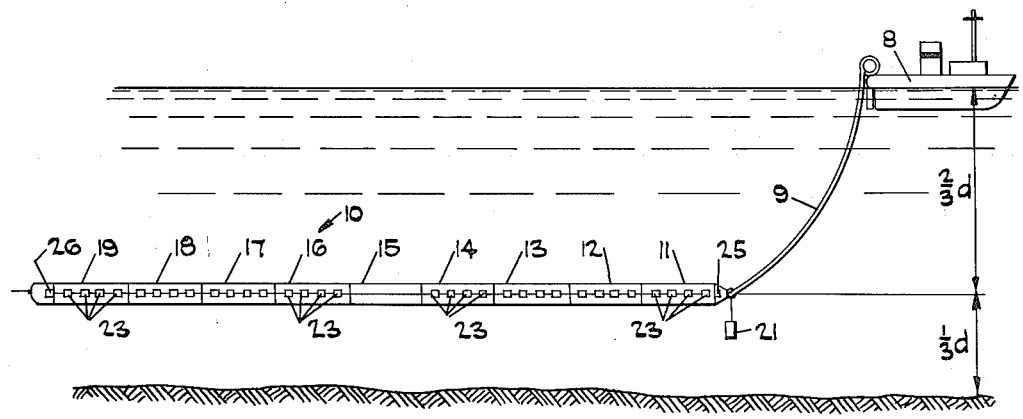

2,735,303

SEISMIC DEPTH GAUGING SYSTEM

Richard J. Haase, Houston, Tex., assignor to Shell Development Company, Emeryville, Calif., a corporation of Delaware Application August 3, 1953, Serial No. 371,751

2 Claims. (Cl. 73—398)

This invention relates to offshore seismic operations and pertains more particularly to a system whereby the submergence depth of elements responsive to seismic waves may be readily determined for the purpose of maintaining said elements within a body of water at a level particularly favorable to the reception and recording of undistorted seismic impulses.

Detectors used for the reception of seismic impulses or reflections over submerged areas are usually of the seismometer, or velocity-responsive type, or of the microphone or pressure-responsive type.

Various systems commonly involving the use of floats or surfboards towed from a vessel, have been developed for supporting seismic detectors in water or moving them therethrough.

A system particularly suitable for increasing the speed of offshort seismic operation by the dispensing with the cumbersome handling of detector floats is described in U. S. Letters Patent 2,465,696 granted to L. C. Paslay on March 29, 1949.

The essential element of this system consists of a length of cable towed by means of a lead-in cable from a seismic survey vessel and having a plurality of pressure sensitive microphones embedded therein.

More particularly, said cable or microphone streamer consists of an outer envelope of flexible tubing made of rubber or of any suitable resilient synthetic variety thereof. Embedded within said envelope at suitably chosen axial intervals are units or housings containing microphones, preferably of the piezo-electric crystal type, auxiliary equipment therefor such as amplifiers, buoyancy floats, and the like.

Extending longitudinally through the cable and passing through special openings in the units embedded therein are a plurality of steel strain cables and electrical conductors connected to the microphones. All the rest of the space within the flexible envelope of the cable is filled with a suitable mineral oil, the specific gravity of this oil being selected so as to give the whole cable a substantially neutral buoyancy permitting it to maintain itself at any reasonable depth at which it had been disposed.

Although means have been provided to measure the depth to which the cable was immersed, such means have not been satisfactory in several regards.

First, the depth of the cable was measured only at one point. Since the detector streamer or cable has normally a considerable length, such for example as 2700 ft., a depth measurement made at a single point could not serve as a guarantee that the cable was at the same depth throughout its length, especially as additional lengths of lead-in cable are normally payed out from the towing vessel to decrease the speed of the streamer cable through the water at the moment when the shot is recorded. This is a great drawback, as it is essential that the streamer be substantially horizontal at the moment when the shot is recorded.

Second, the depth measuring device itself was normally in contact with the sea water and subjected to the corrosive action thereof, which had an unfavorable effect on both the accuracy of the measurements and on the life of the device.

Third, no depth measuring device of reliable and accurate performance has been developed that was capable of insertion into a streamer cable having normally an outside diameter of somewhat under two inches. Moreover, devices involving the use of electrical resistances varying with depth are not sufficiently sturdy for the desired purpose and are inclined to give erratic results.

It is therefore an object of this invention to provide, for purposes of seismic exploration over water areas, a detector streamer or cable provided with means for accurately measuring the submergence depth of said cable at two or more widely spaced points thereon, whereby said cable can be maintained in a substantially horizontal level throughout its length.

It is also an object of this invention to provide a depth measuring gauge capable of insertion into a streamer cable of relatively small diameter, said gauge being responsive to hydrostatic pressures without any part thereof being subjected to actual contact with corrosive sea water.

It is also an object of this invention to provide a depth gauge of sturdy construction, said gauge being substantially free of delicate moving parts capable of giving erratic results under strenuous conditions of sea operations.

These and other objects of the present invention will be understood from the following description taken with reference to the attached drawings, wherein:

Fig. 1 shows the general arrangement of a marine seismic exploration system involving the use of the present invention;

Fig. 2 is a cross-section view of a microphone streamer or cable comprising the depth-measuring device of the present invention;

Fig. 3 is a circuit diagram of the electrical connections of the present depth gauge.

Referring to Fig. 1, a vessel 8 is shown towing, by means of a lead-in cable 9, a microphone steamer or cable 10 of a type such as already referred to hereinabove. The streamer may comprise any desired number of sections, usually nine as shown at 11–19, which are suitably connected to each other. A depressor weight 21 is attached preferably at the forward portion of the streamer, said weight being chosen so with regard to the specific gravity of the cable and the normal operating speed of towing as to permit the cable to maintain itself at a predetermined level. If desired, additional exterior weights may be attached to or carried by the cable 10 throughout its length to control its buoyancy, as is well understood in the art. Normally the desired predetermined level of the cable is at one-third of the total depth from the bottom, or two-thirds from the surface, said level having been found to be advantageous under ordinary circumstances in bringing about the least amount of distortion due to standing waves.

Each of the cable sections 11–19 is about 300 feet long and each, except the center section 15, carries inserted therein a suitable number of detectors, normally forty, of which four are diagrammatically indicated at 23 in Fig. 1 by way of illustration.

Carried at the leading and the trailing ends of the streamer 10 are depth measuring devices or gauges 25 and 26 of the present invention. It is understood that any desired number of depth gauges may be used with the cable 10. Thus, if said cable shows a tendency to sag in the middle, an additional depth gauge may be carried in the middle section 15. Under ordinary circumstances, however, two depth gauges carried as shown in Figs. 1 and 3 have been found quite satisfactory.

All the microphones of each of the sections 11–19 are connected in parallel, and the network of each section is connected to the recording apparatus aboard the vessel through multiconductor leads passing through the streamer and the lead-in cables, said multiconductor leads providing also special electrical connections for the present depth gauges in accordance with the circuit diagrammatically shown in Fig. 3.

Fig. 2 shows a cross-section view of a portion of the streamer cable 10, which comprises a flexible tubular envelope 30 made of natural or synthetic rubber, particularly such a polyvinyl chloride composition known as extruded vinyl.

Shown embedded within the envelope 30 are one of the microphones 23 and a depth gauge 26, the rest of the space within said envelope throughout the length of the cable 10 being filled with a suitable oil, such as kerosene, naphtha, white oil, etc.

Each microphone 23 comprises, within a suitable housing, desired piezo-electric crystal elements such as tourmaline, barium titanate, ammonium dihydrogen phosphate, etc., arranged and electrically connected to the recording equipment in vessel 8 in a manner well known in the art.

The depth gauge 26 comprises an outer hollow cylindrical member 34 provided with a transverse bottom plate 36 having a central opening adapted to receive and support the end of a mandrel 37 for sliding axial motion therein. The cylinder 34 and mandrel 37 are made of bronze, brass, copper or other non-magnetic material, and the mandrel 37 carries fixedly attached thereto a flange or armature member 39, made of steel, soft iron or other magnetic material.

Positioned within the outer cylinder 34 are an intermediate cylinder 41 and an inner cylinder 43, both made of a magnetic material as above. The cylinder 43 has at one end a bottom flange 45, preferably integral therewith, and carries near its other end a second flange 47 preferably made of a non-magnetic or insulating material such as fiber, Bakelite, etc.

The annular space between the cylinders 41 and 43 and flanges 45 and 47 is filled with a solenoid winding 49, comprising for example about 8000 turns of No. 36 gauge wire and having a resistance of about 400 ohms. The winding 49 is connected to the electrical circuits within the cable 10 by conductors 51 and 53.

Fixedly attached to the outer face of the bottom plate 36 is a flexible diaphragm 55, made of rubber or other suitable resilient material, against which an end of the mandrel 37 is arranged to press. The other end of the mandrel 37 is in register with an adjusting screw 57 held by a spider 59 affixed to the cylinder 34. The length of the mandrel 37, and the position of the armature 39 thereon are so chosen, and the setting of the adjusting screw 57 is so regulated that when one end of the mandrel 37 presses against the diaphragm 55 and the other end abuts the adjusting screw 57, the clearance or gap between the armature member 39 and the adjoining faces of the cylinders 41 and 43 is of the order of 0.005 inch.

The circuit of the depth gauge 26, which is arranged at the trailing end of the streamer cable 10, and of the gauge 25, which is arranged at the leading end thereof, is shown in Fig. 3. The two gauges are connected in parallel through a selector switch 61 to a circuit comprising a source of current 63, an indicating device such as a milliammeter 65 and a rheostat 67. A transformer 69 couples this circuit with that of a thyratron relay generally indicated at 70.

The principle of operation of the present depth measuring system is briefly as follows. The hydrostatic head of water through which the streamer cable 10 is towed is applied, through the resilient envelope 30, to the oil with which the cable is filled. The oil transmits this pressure through the diaphragm 55 to the mandrel 37 in such a direction as to push the armature 39 away from the face of the yoke formed by cylinders 41 and 43, the stop 57 preventing this separation from exceeding a small value such as 0.005 inch. By gradually decreasing the resistance of the rheostat 67, the current in the circuit through coil 49 is increased until it is of such intensity that its magnetic pull overcomes the pressure exerted by the hydrostatic head on mandrel 37, whereupon the armature moves into contact with the yoke 41—43. The electric transient produced upon the closure of the magnetic circuit 39—41—43 triggers the thyratron 71 which fires to close the switch 72, thereby lighting the lamp 73 or operating any other signal device. This indicates to the operator that the current indicated by milliammeter 65 at this instant is the amount required to overcome the hydrostatic pressure.

In operation, the present gauges are suitably calibrated before insertion into the cable 10. For this purpose, a pressure or force of known magnitude is applied to the diaphragm to separate the armature from the yoke, and the slider of rheostat 67 is gradually moved to increase the current through the solenoid coil 49. A reading is taken on milliammeter 65 at the moment when armature is pulled back into contact with the yoke, as indicated by the signal device 73. This procedure is repeated for a series of gradually increasing pressures applied to the diaphragm 55. The calibration curve obtained by plotting the gradually increased pressures applied to the diaphragm 55 against the gradually increasing current intensities indicated by the milliammeter 65 is very nearly a straight line.

The depth gauges are then inserted into the streamer cable at the leading and trailing ends thereof, and at such additional points as may be desired, and the cable is taken in tow by a surveying vessel. From time to time, the depth gauge operator flips the switch 61 to gauge 25 or gauge 26, gradually decreases the resistance of rheostat 67 until lamp 73 lights, reads the current shown by milliammeter 65, and determines the depth of the gauge being tested from the calibration chart. Should either one or both of said gauges show a deviation from the predetermined depth, thus showing that the cable is not horizontally disposed, or has altogether departed from the desired level, necessary measures can be taken to remedy such conditions, for example, by changing the speed of the vessel, the length of the lead-in cable, the size of the outside weights carried by the cable, or by the use or suitable manipulations of drogues attached thereto, all in a manner well known in the art.

The present depth gauges have been found very reliable in operation under most difficult conditions, which is believed mostly due to the practically complete absence of moving parts, the movement of the armature 39 through a distance such as 0.005 inch being substantially negligible. Furthermore, since motion takes place only as between elements of the magnetic, but not of the electric circuit, the operation of the device does not give rise to sparking with its undesirable effects, and can moreover readily take place in a space completely filled with oil.

Although the present depth gauge has been described hereinabove in its most important application, it is understood that it may equally well be used in a variety of other fields not connected with seismic exploration.

I claim as my invention:

1. In a fluid pressure indicator, a magnetic yoke comprising coaxial inner and outer cylinders separated by an annular gap therebetween, a magnetic material element permanently closing said gap at one end of the yoke, a mandrel passing through the inner cylinder and movable along the axis thereof, an armature carried by the mandrel, said armature being adapted to contact the faces of said cylindrical members perpendicular to the axis thereof to close magnetically said annular gap at the other end of the yoke, means comprising a diaphragm exposed to fluid pressure for applying pressure to the mandrel in such a direction as to move the armature out of contact with said yoke, a solenoid winding disposed in said annular gap, means comprising a source of current connected in circuit with the solenoid winding for applying to the armature an electromagnetic pull to move said armature in the opposite direction when said circuit is closed, current carrying means manually operable to change the intensity of the current in the solenoid to cause the solenoid to pull the armature into contact with the faces of said cylindrical members, signal means responsive to the electrical transient arising when said faces are contacted by said armature, and indicator means connected in said circuit for indicating the intensity of the current in the solenoid winding at the instant when said annular gap is magnetically closed by said armature against the effect of said pressure.

2. The apparatus of claim 1, wherein said signal means comprise a thyratron, transformer means coupling the input of said thyratron with the circuit of said solenoid winding, and signalling means actuated by the output current of said thyratron.

References Cited in the file of this patent

UNITED STATES PATENTS

| | | |
|---|---|---|
| 1,953,819 | Payne | Apr. 3, 1934 |
| 2,407,361 | Wilson | Sept. 10, 1946 |
| 2,465,696 | Paslay | Mar. 29, 1949 |
| 2,567,253 | Strange et al. | Sept. 11, 1951 |

FOREIGN PATENTS

| | | |
|---|---|---|
| 169,291 | Austria | Oct. 25, 1951 |